United States Patent
Neel et al.

(10) Patent No.: US 8,237,104 B2
(45) Date of Patent: Aug. 7, 2012

(54) DEVICE FOR TRAPPING PARTICLES

(75) Inventors: Delphine Neel, Venissieux (FR); Stéphane Getin, Grenoble (FR); Bérangère Hyot, Eybens (FR); Salim Mimouni, St Martin le Vinoux (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 31 days.

(21) Appl. No.: 12/994,447

(22) PCT Filed: May 25, 2009

(86) PCT No.: PCT/EP2009/056274
§ 371 (c)(1), (2), (4) Date: Jan. 3, 2011

(87) PCT Pub. No.: WO2009/144187
PCT Pub. Date: Dec. 3, 2009

(65) Prior Publication Data
US 2011/0101211 A1    May 5, 2011

(30) Foreign Application Priority Data
May 26, 2008    (FR) ..................... 08 53414

(51) Int. Cl.
*H01S 1/00* (2006.01)
(52) U.S. Cl. ...................................... 250/251
(58) Field of Classification Search .................... 250/251
See application file for complete search history.

(56) References Cited

U.S. PATENT DOCUMENTS

| | | | |
|---|---|---|---|
| 2007/0069119 A1* | 3/2007 | Appleyard et al. | 250/251 |
| 2008/0212179 A1* | 9/2008 | Quidant et al. | 359/483 |
| 2009/0002807 A1* | 1/2009 | Hendriks et al. | 250/251 |
| 2011/0100880 A1* | 5/2011 | Recami et al. | 250/251 |

FOREIGN PATENT DOCUMENTS

DE    102004052146 A1    6/2006

OTHER PUBLICATIONS

Gu, M., et al., "Laser Trapping and Manipulation under focused evanescent wave illumination" Appl. Phys. Lett. 84, 4236 (2004).*
Kawata, S., et al., Movement of micrometer-sized particles in the evanescent field of a laser beam Optics Letters, vol. 16, No. 11 (1982).*
Volpe, G., et al. "Surface Plasmon Radiation Forces" PRL 96, 238101 (2006).*
International Search Report, PCT/EP2009/056274, dated Jul. 29, 2009.
French Preliminary Report, FR 08 53414, dated Jan. 23, 2009.

* cited by examiner

*Primary Examiner* — Jack Berman
*Assistant Examiner* — Wyatt Stoffa
(74) *Attorney, Agent, or Firm* — Nixon Peabody LLP

(57) ABSTRACT

A device for trapping particles contained in a liquid (L) placed in a tank, characterized in that it comprises a substrate that is transparent at a working wavelength, a thin layer of material with non-linear optical properties that are reversible at the working wavelength and which is fixed to a first face of the transparent substrate to form all or part of at least one wall of the tank, a device for forming an optical trap which comprises a laser source which emits a laser beam and means for forming a waist of the laser beam, the laser beam being incident upon that face of the transparent substrate that lies on the opposite side to the first face and the waist of the laser beam being formed in the thin layer, an evanescent electromagnetic field forming at the surface of the thin layer.

10 Claims, 9 Drawing Sheets

DEVICE FOR TRAPPING PARTICLES

CROSS REFERENCE TO RELATED APPLICATIONS or PRIORITY CLAIM

This application is a National Phase of PCT/EP20091056274, filed May 25, 2009, entitled, 'DEVICE FOR TRAPPING PARTICLES", and claims priority of French Patent Application No. 08 53414, filed May 26, 2008.

TECHNICAL FIELD AND PRIOR ART

The invention relates to a device for trapping particles.

The device of the invention finds applications, for example, in the field of nanotechnologies (manipulation and assembly of dielectric, semi-conducting and metallic micro and nano-particles, nanowires or nanotubes), biology (manipulation of macromolecules such as proteins, DNA) and organic chemistry (macromolecules, polymers or organometallics).

According to the prior art, a device for forming an optical trap comprises a laser source which emits a laser beam and means of focusing the laser beam which strongly concentrate the laser beam by means of a microscope objective, the numerical aperture of which is greater than 1.

FIGS. 1A and 1B illustrate the known principle of trapping a particle P by means of an optical tweezer. A particle P is placed in a liquid L. A laser beam F emitted by a laser source (not represented in the figure) is focused in the liquid L and has a central zone of smaller diameter W, commonly known as "waist". If the particle P has a refractive index greater than that of the liquid medium L that surrounds it and if it finds itself placed in the proximity of the beam, it enters, under the effect of forces commonly known as "gradient forces", into the field of the beam F (cf. FIG. 1A). In fact, these forces attract the particle P towards the maximum intensity of the beam, in other words at the level of the waist. The particle then comes to a halt at the centre of the waist (cf. FIG. 1B).

The particle thereby trapped is then displaced by relative displacement of the beam F and the medium containing the particle (displacement of the medium containing the particle P in relation to the beam, displacement of the beam F in relation to the medium, mutual displacement of the beam and the medium). The diameters of the particles trapped range from ten or so microns to ten or so nanometers. The particles may be of different natures: dielectric, metallic, semi-conductor, biological, polymeric, etc.

A major drawback of the method for trapping particles described above is that the trapping volume of the tweezer is limited by the diffraction at the level of the objective. The trapping volume depends in fact on the size of the waist of the beam, which is linked to the wavelength used, to the numerical aperture of the objective as well as the index of the medium in which the objective is bathed. The positioning precision by an optical tweezer of this type is of several hundreds of manometers, or even of the micron, which is not good precision.

To improve the localisation of the particle, it is known to use a category of optical traps that are based on optical near-field effects. Optical traps of this type have a high spatial confinement of the electromagnetic field and thus enable a more precise localisation of the object. The positioning precision is of the order of ten or so manometers.

A first example of this type of optical trap is given in FIG. 2. A metal mask M provided with nano-apertures O is deposited on a structure T. The structure T is transparent at the wavelength of the laser beam F that has to trap the particles. The laser beam F propagates in the structure T along a direction substantially perpendicular to the flat surface on which is deposited the mask M. The laser beam F then traverses all of the apertures O that thus constitute as many traps for the particles. It is then possible, for example, to trap a latex particle of 200 nm diameter in a nano-aperture of 500 nm diameter. The drawbacks of such an optical tweezer are, on the one hand, that the number of steps linked to the production of nano-apertures is high and, on the other hand, that the particles are not trapped in a free space but in a hole.

It is also known from the prior art to use SNOM technology (SNOM for "Scanning Near-field Optical Microscope") to form an optical trap. The optical trap is then formed, for example, by means of a gold tip placed in a laser beam. It is the over-intensity of the electromagnetic field that appears at the end of the tip that traps the particle. A gold tip of 5 nm apex radius is then capable of trapping a particle of latex of 10 nm diameter placed in water. FIG. 3 represents a schematic diagram of such a tip Pt placed in a laser beam and the distribution of the intensity of the electromagnetic field around the tip. The intensity levels increase as the tip is approached (darker and darker zones in FIG. 3). The drawbacks of such a device are in its operating cost and in the fact that it is parallelisable with difficulty.

FIGS. 4A and 4B relate to another known optical trapping device with optical near-field effect. This other known device comprises a photonic crystals lattice Ph in which is formed a cavity Q. The photonic crystals lattice Ph is fixed to a transparent substrate T. A laser beam F traverses the substrate T to attain the photonic crystals lattice Ph. For a given wavelength of the laser beam F, an over-intensity is created at the level of the cavity Q. FIG. 4B illustrates the presence of this over-intensity. FIG. 4B represents the normalised power R which is radiated, at the level of the cavity Q, by the device of FIG. 4A. The curve of the normalised power R is drawn as a function of the normalised propagation wavelength $\Lambda$ of the wave in the device ($\Lambda$ is expressed in multiples of the period "a" of the photonic crystals lattice). At a given wavelength $\Lambda_0$, an over-intensity of the optical power appears in the lattice. This over-intensity is used for trapping the particles. The drawbacks of such a device are the large number and the complexity of the different technological steps necessary for the production of the photonic crystals lattice, the cost of the tunable laser source necessary for the correct operation of the device and the adjustment of the tuning wavelength $\Lambda_0$ which depends on the size, the shape and the nature of the particles.

Another optical trapping device with optical near-field effect is also known from the prior art. This other device is represented in FIG. 5. It comprises a prism Pr transparent at the working wavelength on which are deposited a blade of glass V and a thin layer of gold f. A laser beam F traverses the prism and the blade of glass V until reaching the layer of gold f on which it reflects to create the reflected beam Fr. The direction of the laser beam F must deviate from the normal to the blade of glass (i.e. the angle of incidence θ of the beam on the blade of glass must not be zero). The coupling of the laser light in the metallic layer f leads to the formation of a plasmon at the surface of the layer of gold f and to the appearance of an evanescent electromagnetic field Ev on this surface. The particles are then trapped according to an annular layout which results from two contributions:

a) The optical forces attract the objects towards the centre of the beam;

b) The thermophoretic forces expel the particles of the beam.

A drawback of this device is its complexity due, among others, to the use of a prism.

The invention does not have the aforementioned drawbacks.

DESCRIPTION OF THE INVENTION

Indeed, the invention relates to a device for trapping particles contained in a liquid placed in a tank, characterised in that it comprises a substrate transparent at a working wavelength, a thin layer of material with non-linear optical properties that are reversible at the working wavelength and which is fixed to a first face of the transparent substrate to form all or part of at least one wall of the tank in contact with the liquid, a device for forming an optical trap with optical near-field effect which comprises a laser source which emits a laser beam at the working wavelength and means for forming a waist of the laser beam, said means being positioned in relation to the transparent substrate so that the laser beam is incident upon a second face of the transparent substrate that lies on the opposite side to the first face and the waist of the laser beam being formed in the thin layer, an evanescent electromagnetic field forming in the extension of the waist of the laser beam, at the surface of the thin layer.

According to an additional characteristic of the invention, the device for trapping particles comprises an optical mask provided with apertures deposited on the thin layer.

According to another additional characteristic of the invention, the device for trapping particles comprises an optical mask provided with apertures placed between the thin layer and the first face of the substrate.

According to yet another additional characteristic of the invention, a light modulator modulates the phase of the laser beam so that several elementary laser beams form under the action of the light modulator, each elementary laser beam participating in the formation of an evanescent field at the surface of the thin layer.

According to yet another additional characteristic of the invention, each evanescent field at the surface of the thin layer is capable of trapping a particle.

According to yet another additional characteristic of the invention, an additional layer having an antireflection or mirror function is placed between the thin layer and the substrate.

According to yet another additional characteristic of the invention, a negative refractive index lens is placed at the surface of the thin layer, in contact with the liquid.

According to yet another additional characteristic of the invention, the negative index lens includes a stack of metal/dielectric bilayers.

According to yet another additional characteristic of the invention, the thin layer is covered with a treatment layer capable of controlling the wettability of the surface of the thin layer that is in contact with the liquid.

According to yet another additional characteristic of the invention, the treatment layer is hydrophobic.

In a very advantageous manner, the thin layer constitutes, due to the reversible character of the non-linearity created in this layer by the laser beam, a luminous intensity mask that is displaced with the laser beam. The device of the invention thus does not necessarily have to comprise a complex nano-structure to localise with precision small or large objects (typical dimensions ranging from 10 nm to more than 1 μm), as is the case for devices of the prior art.

BRIEF DESCRIPTION OF THE DRAWINGS

Other characteristics and advantages of the invention will become clear in the description that follows, made with reference to the appended figures, among which.

DETAILED DESCRIPTION OF PREFERENTIAL EMBODIMENTS OF THE INVENTION

Figure 6:
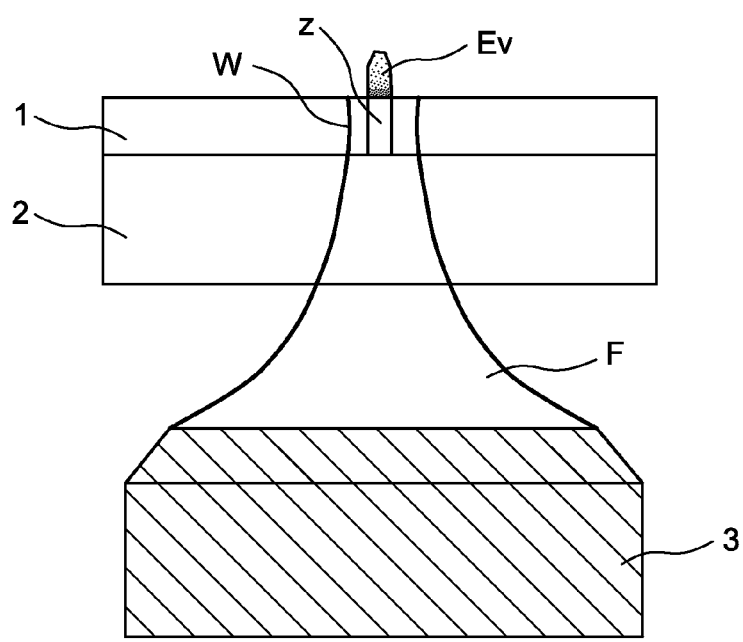
FIG. 6 represents a device for forming an optical trap with optical near-field effect according to the invention.

FIG. 6 represents a device for forming an optical trap with optical near-field effect according to the invention. The device comprises an objective 3 that focuses a laser beam F coming from a laser source (not represented in the figure), a support 2 transparent at the wavelength of the laser beam and a thin layer 1 of material with non-linear optical properties that are reversible at the working wavelength deposited on the support 2. "Material with non-linear optical properties that are reversible" is taken to mean a material whose refractive index changes as a function of the lighting that it receives, the number of photons arriving on this material being taken per unit of solid angle, and returns to its initial value once the illumination has stopped. The material with non-linear optical properties that are reversible is, for example, a semiconductor material of III-V type with low forbidden band (for example InSb, GaAs, InAs, InP, GaP, CdTe, ZnS, CdS, etc.) or weakly doped (for example $In_xSb_yTe_z$), or a material composed of KDP, or $KH_2PO_4$, or $LiNbO_3$, or $LiTaO_3$, or $BaTiO_3$, or $KNbO_3$, or $Bi_{12}SiO_{20}$, or $Bi_{12}TiO_{20}$, or KTP, or a phase change material such as, for example, a chalcogenide. The objective 3 focuses the laser beam F so that the waist W of the beam is situated in the thin layer 1. Under the effect of the laser light concentrated at the level of the waist, the thin layer 1 changes electronic structure in the manner observed during optical recording super-resolution phenomena (cf. Pichon et al. "Multiphysics Simulation of Super-Resolution BD ROM Optical Disk Readout", pages 206-208, ODS 2006). The laser beam is then confined, within the thin layer 1, in a zone z of dimensions less than the diffraction limit in this layer and exits the thin layer 1 in the form of a highly concentrated evanescent electromagnetic field Ev. This highly concentrated evanescent electromagnetic field enables a very efficient optical trapping of particles.

Figure 1A:
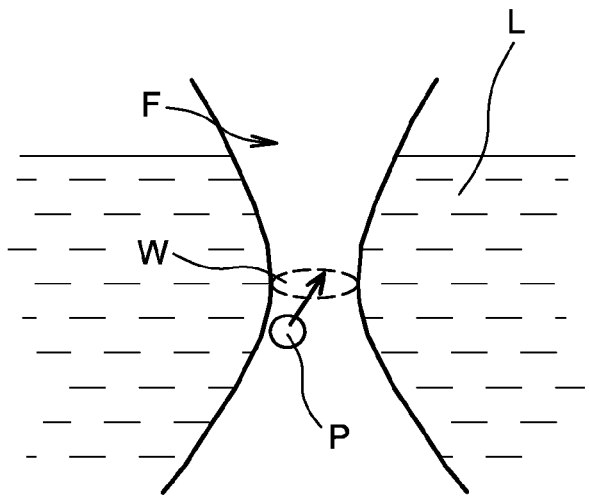
FIGS. 1A and 1B illustrate the principle of trapping a particle by means of an optical tweezer according to the prior art.
Figure 1B:
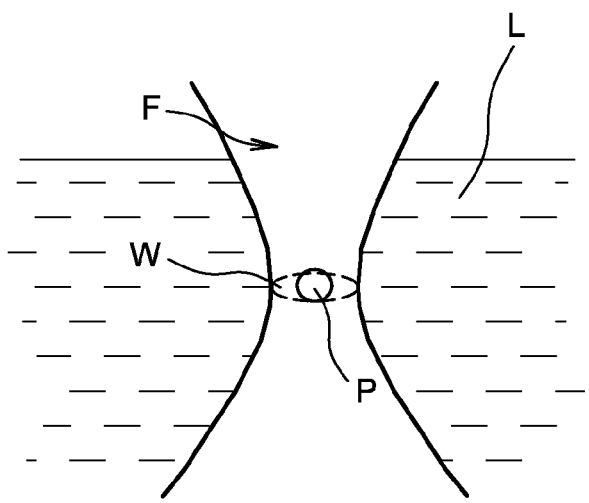
Figure 2:
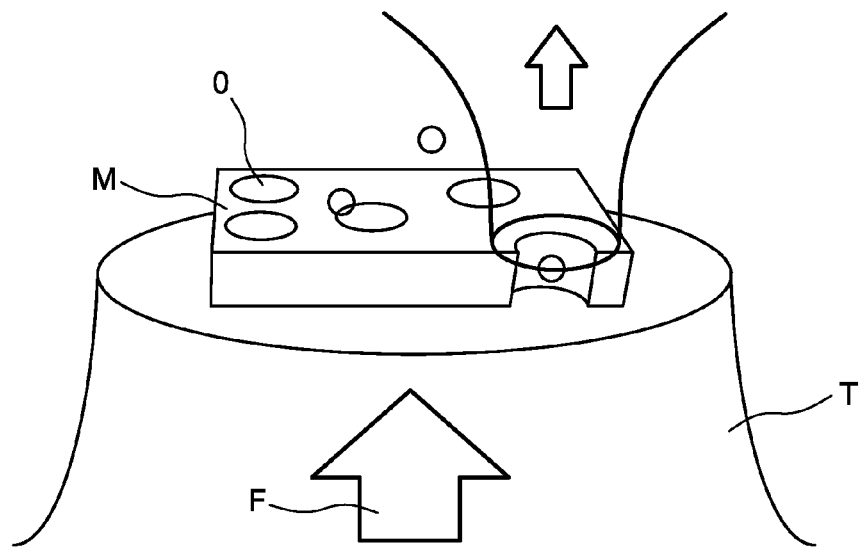
FIG. 2 represents a first example of device for forming an optical trap with optical near-field effect according to the prior art.
Figure 3:
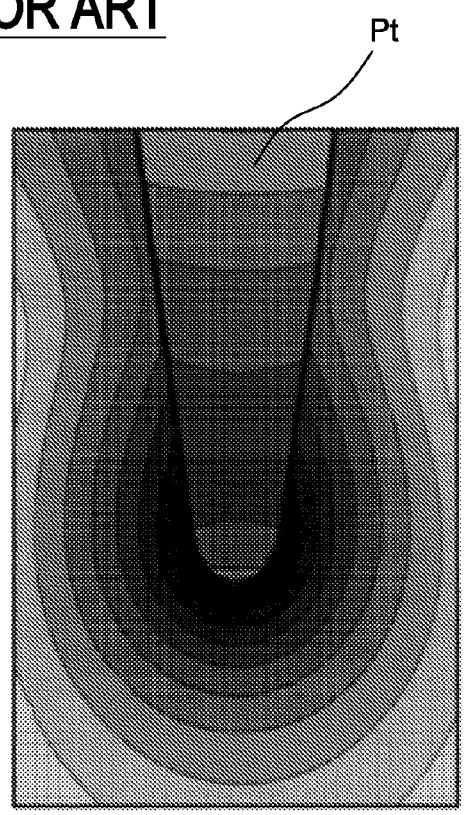
FIG. 3 represents a second example of device for forming an optical trap with optical near-field effect according to the prior art.
Figure 4A:
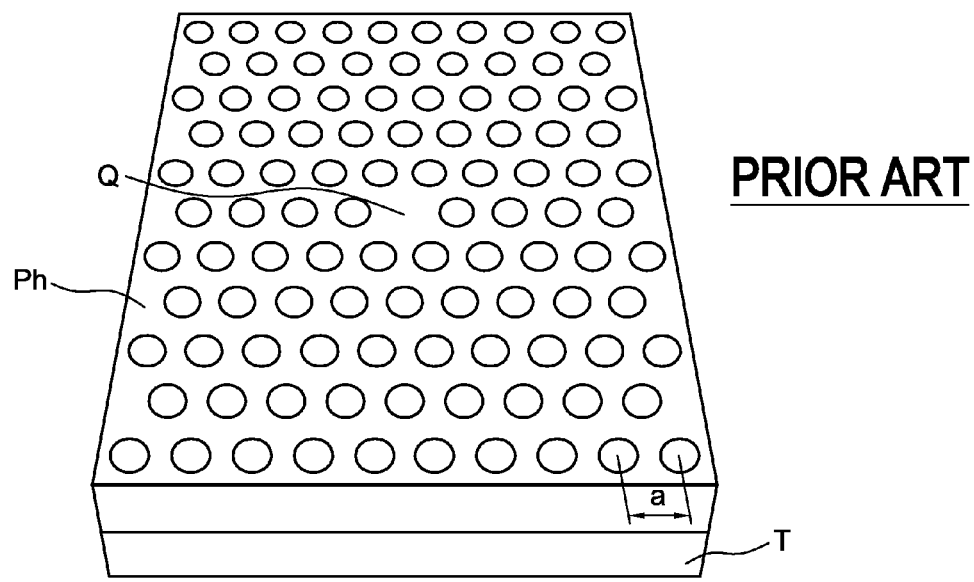
FIGS. 4A and 4B illustrate a third example of device for forming an optical trap with optical near-field effect according to the prior art.
Figure 4B:
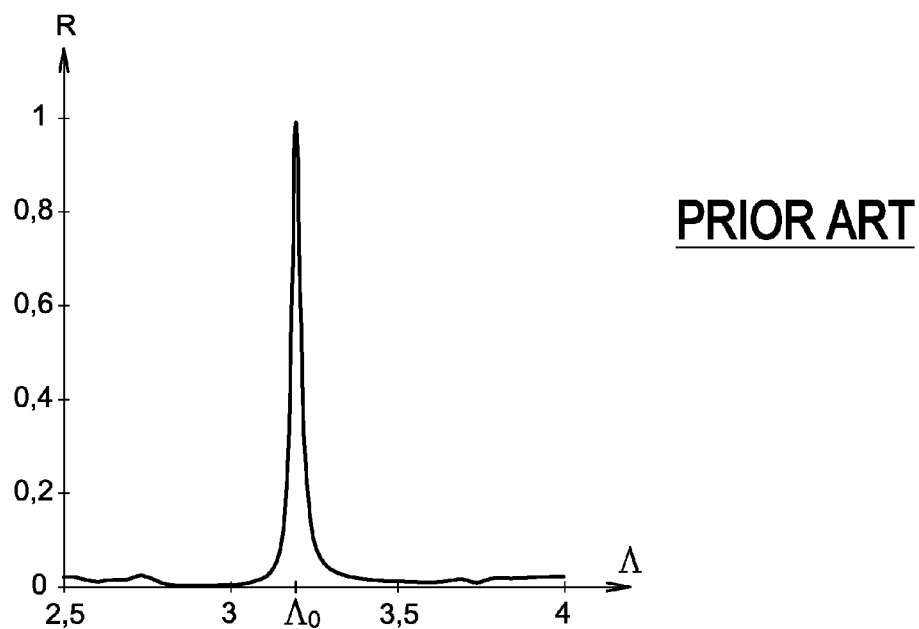
Figure 5:
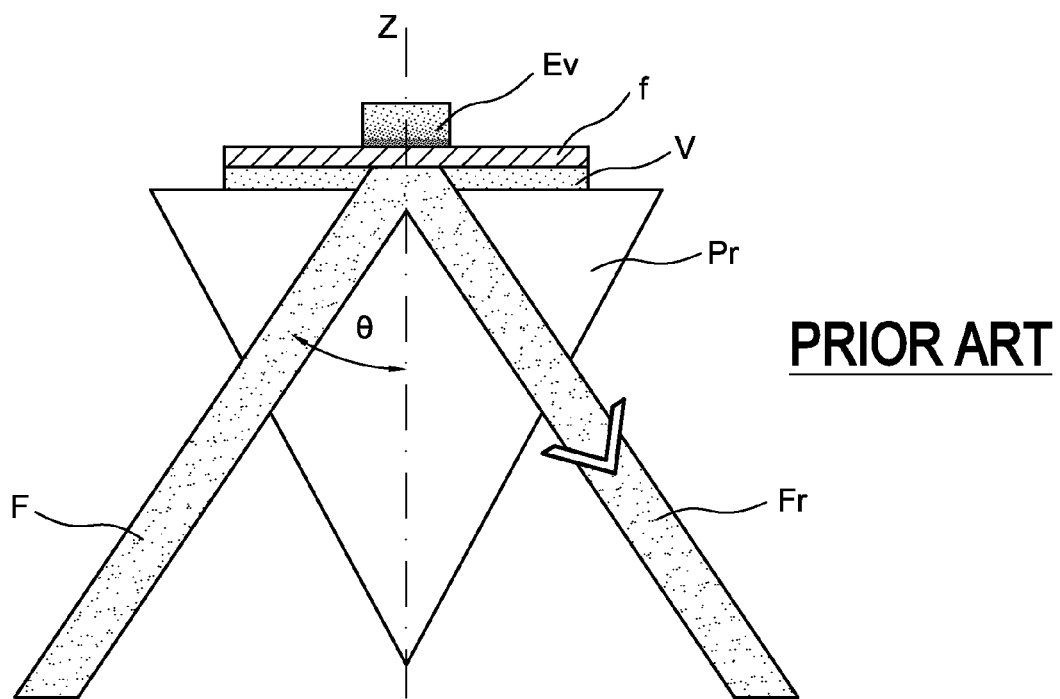
FIG. 5 represents a fourth example of device for forming an optical trap with optical near-field effect according to the prior art.
Figure 7A:
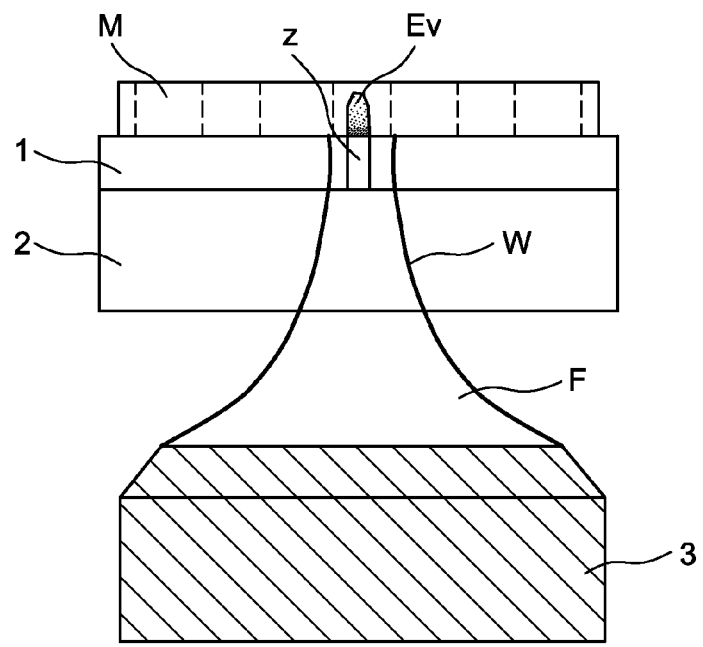
FIGS. 7A and 7B represent respectively a first alternative and a second alternative of a first improvement of the device for forming an optical trap with optical near-field effect of the invention.

FIG. 7A represents a first alternative of a first improvement of the device for forming an optical trap with optical near-field effect according to the invention. The optical trap comprises an optical mask M such as that mentioned previously with reference to FIG. 2. The mask M is placed on the face of the layer 1. The mask M advantageously creates a local over-intensity which, combined with the over-intensity created by the thin layer 1, leads to an even greater concentration of the evanescent field. It is then advantageously possible to use a laser beam of less power than in the configuration without mask while obtaining identical results in terms of concentration of the evanescent field.

Figure 7B:
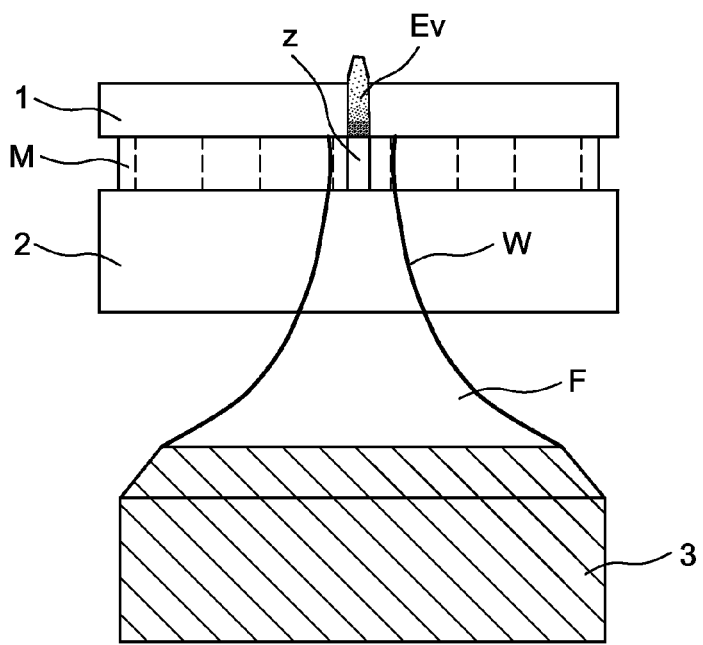
Figure 8:
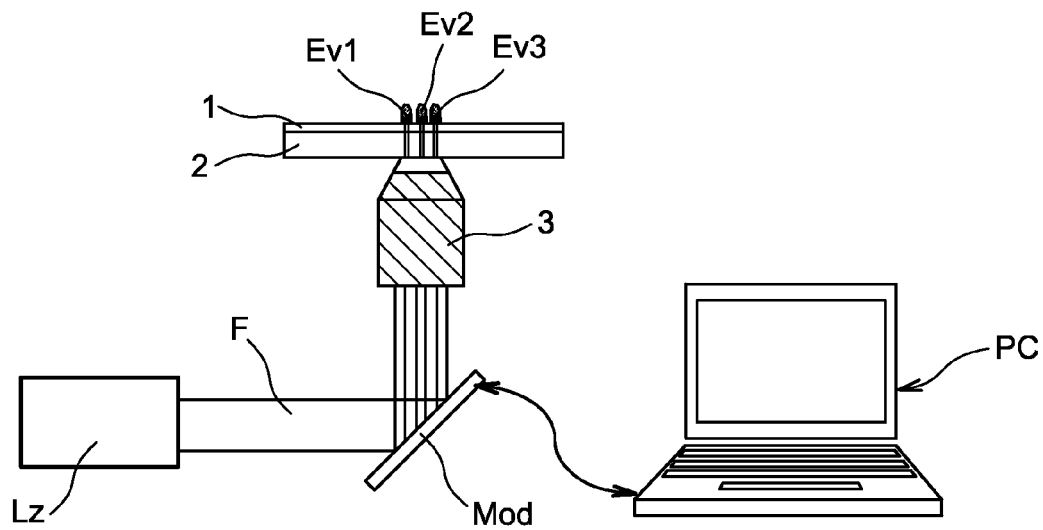
FIG. 8 represents a second improvement of the device for forming an optical trap with optical near-field effect of the invention.

According to a second alternative of the first improvement of the invention, the optical mask M is placed under the face of the thin layer 1, in other words between the thin layer 1 and the transparent support 2. FIG. 7B illustrates this second alternative. FIG. 8 represents a second improvement of the device for forming an optical trap of the invention. In addition to the components of the device of the invention represented in FIG. 6, the device represented in FIG. 8 comprises a spatial light modulator Mod, for example a liquid crystal display, and a computer or a personal computer PC that commands the spatial light modulator Mod. In a known manner, as a function of the commands that are applied to it from the computer, the light modulator Mod modulates the phase of the laser beam F from the source Lz so that n elementary laser beams are formed under the action of the light modulator, n being a whole number greater than or equal to 2 (n=3 in FIG. 8). Each elementary laser beam creates, at the surface of the layer 1, an elementary evanescent field $Ev_i$ (i=1, 2, . . . , n) which is capable of capturing a particle. It is thus possible to manipulate up to n particles at the same time. In the particular case where important thermophoretic effects appear in the layer 1, a particle surrounded by several elementary laser beams may be maintained at the centre of these beams by repulsion. Means other than a liquid crystal display may be used for the formation of multi-beam tweezers such as, for example, an interferometer or a diffraction grating, or a hologram.

Figure 9:
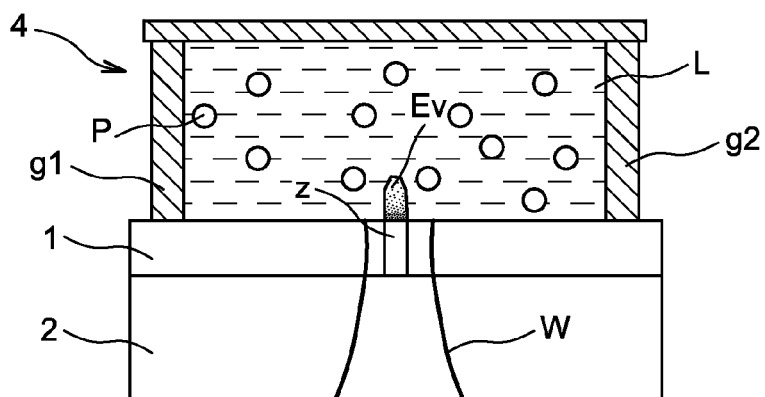
FIG. 9 represents a device for trapping particles which comprises a device for forming an optical trap conforming to the device represented in FIG. 6.
Figure 9:
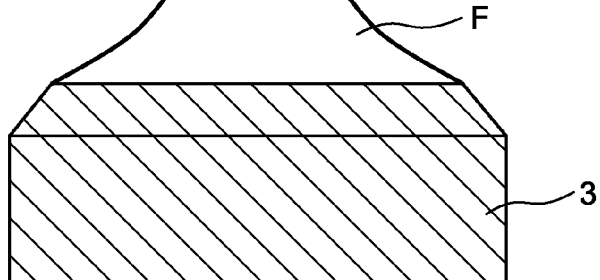

FIG. 9 represents a device for trapping particles which is associated with the device for forming an optical trap with optical near-field effect represented in FIG. 6. The particles P move about in a liquid L contained in a tank 4, the lower wall of which is formed by the thin layer 1. The highly concentrated evanescent electromagnetic field Ev traps any particle situated in its vicinity. To achieve a displacement of a particle thereby trapped, a relative displacement of the laser beam F and of the structure constituted of components 1, 2 and 4 is carried out.

The thickness of the thin layer 1 may vary, for example, from 5 nm to 100 nm. The laser beam F may be a continuous or pulsed beam in a range of frequencies ranging from Hz to THz. As regards the particles capable of being trapped by an optical tweezer of the invention, the table below illustrates several examples thereof, in a non-limitative manner:

| Object (material) | Dimensions |
|---|---|
| Dielectric beads ($SiO_2$, $Ta_2O_5$, ZnO, Latex, $TiO_2$, $Al_2O_3$) | 5 nm to 5 μm diameter |
| Metal beads or ellipsoids (Au, Ag, Cu, Al) | 5 nm to 5 μm diameter or large axis |
| Metal nanobeads and dielectric shell systems | Beads 1 to 100 nm diameter and dielectric shells 20 to 500 nm thickness |
| Semi-conductor nanocrystals (ZnS/CdSe, InSb, Ge) | 5 to 100 nm nanocrystals with dielectric shells of 0 to 20 nm |
| Dielectric or semi-conductor nanowires (Si, ZnO, GaN, $SiO_2$) | Wires 5 nm to 500 nm diameter and 100 nm to 10 μm length |
| Macromolecules (DNA, RNA, proteins) | 5 nm to 5 μm length of molecular chain |
| Cells (yeasts, red blood cells, lymphocytes, etc.) | 500 nm to 10 μm diameter |

The substrate 2 transparent at the working wavelength is made, for example, from silicon (Si), polycarbonate, glass, silica, etc.

Figure 10:
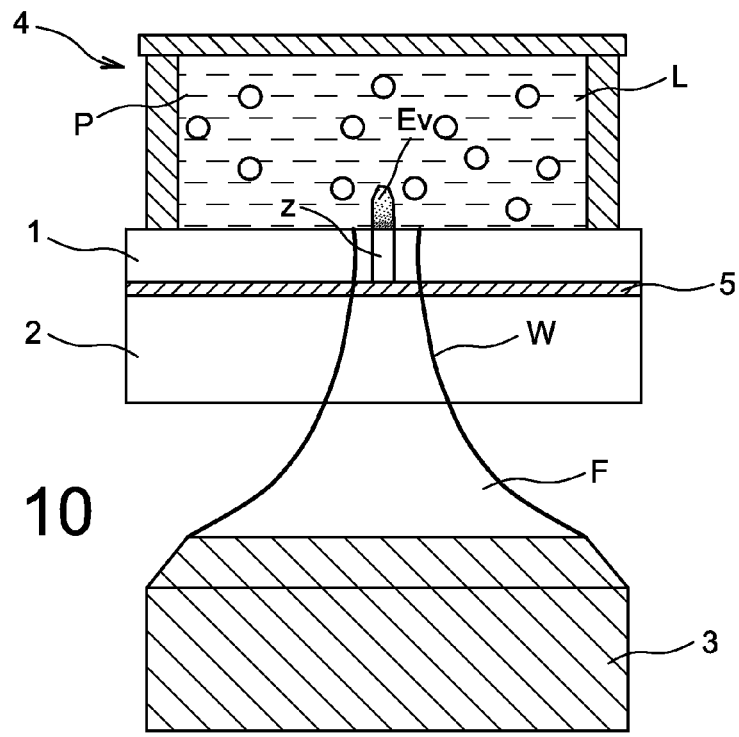
FIG. 10 represents a first improvement of the device for trapping particles represented in FIG. 9.

FIG. 10 represents a first improvement of the device for trapping particles represented in FIG. 9. In addition to the components mentioned with reference to FIG. 9, the device of FIG. 10 comprises, between the substrate 2 and the layer 1, an additional layer 5 that has an optical function, for example antireflection/mirror. The layer 5 is made of a single layer or of a series of layers. The thickness of the layer or the series of layers that constitute the layer 5 is typically between 10 nm and 10 μm. The layer 5 between the substrate 2 and the layer 1 is formed by sol-gel, PVD (PVD for "Physical Vapour Deposition"), IBS (IBS for "Ion Beam Sputtering", sputtering, CVD (CVD for "Chemical Vapour Deposition") etc.). In a first alternative of the invention, the material(s) that constitute the layer 5 is (are) chosen from dielectrics such as, for example, $SiO_2$, $HgO_2$, $Ta_2O_5$, $TiO_2$, $ZrO_2$, $Al_2O_3$, $YF_3$, LaF, $Ta_2O_6$. In another alternative of the invention, the layer 5 constitutes a heat sink which makes it possible to avoid heating the liquid L, in which said heating can occur under the effect of the laser beam. The material(s) that constitute the layer 5 are then chosen from metals (for example, copper, aluminium, etc.), oxides, or nitrides (for example $Si_3N_4$).

Figure 11:
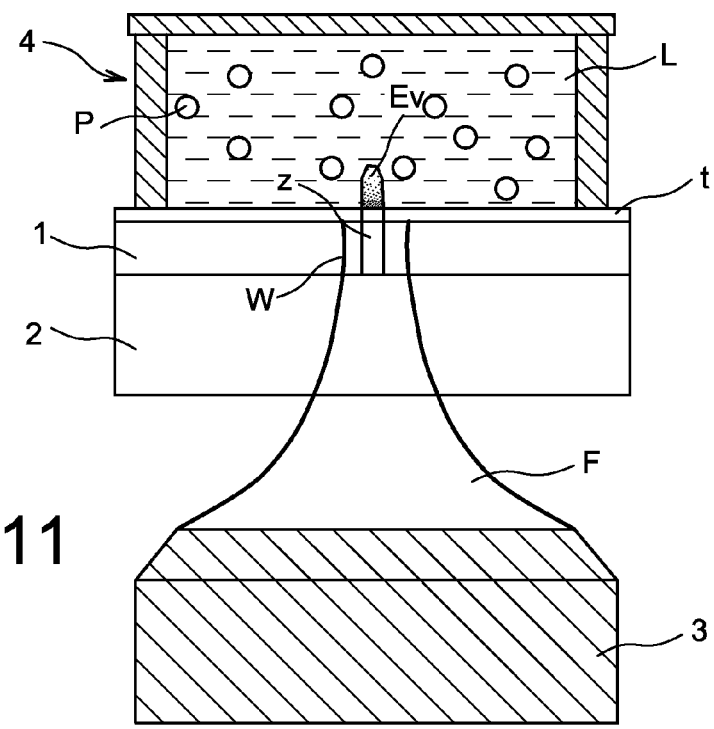
FIG. 11 represents a second improvement of the device for trapping particles represented in FIG. 9.

FIG. 11 represents a second improvement of the device for trapping particles of the invention. The thin layer 1 is covered with a treatment making it possible to control the wettability of the surface on the part of the stack in contact with the liquid L. A hydrophobic treatment is carried out, for example, by a layer of polytetrafluoroethylene, commonly known as Teflon, or by grafting of appropriate organic molecules to form, for example, a layer of silane. The hydrophobic layer t advantageously makes it possible to prevent the particles P adhering to the thin layer 1.

Figure 12:
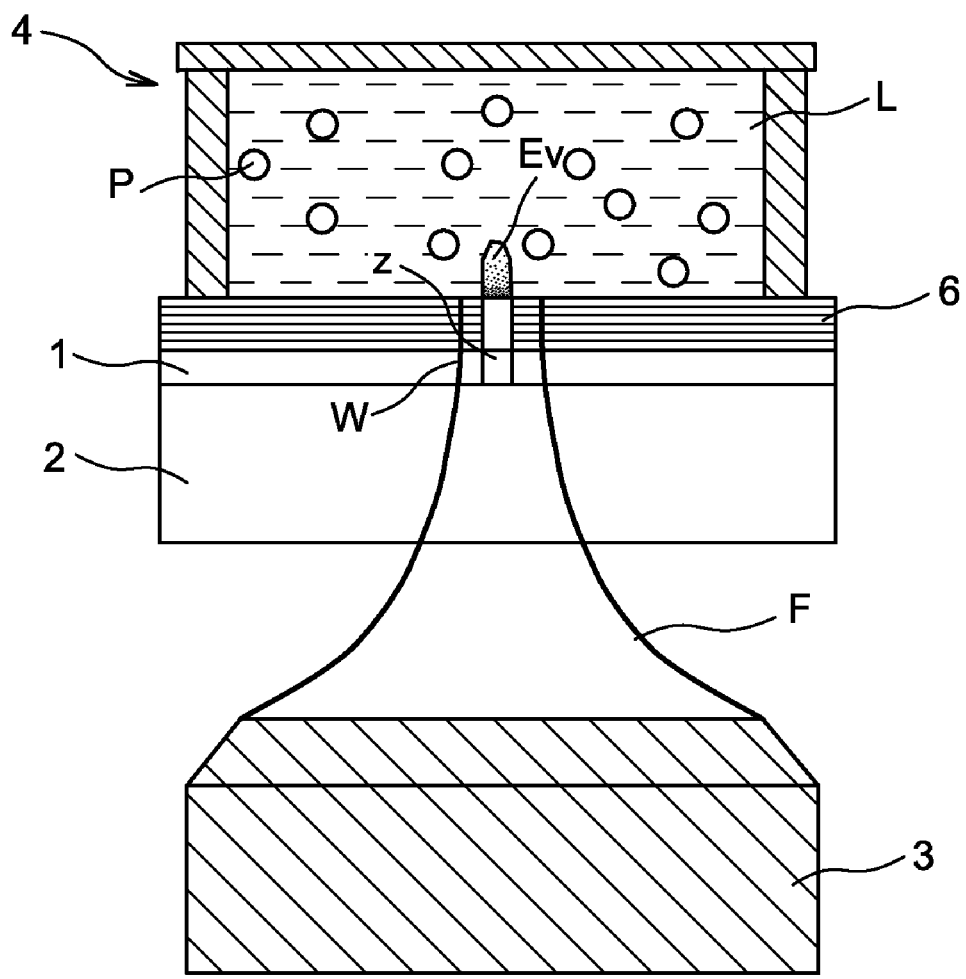
FIG. 12 represents a third improvement of the device for trapping particles represented in FIG. 9.

FIG. 12 represents a third improvement of the device for trapping particles of the invention. The device comprises, above the layer 1, a negative refractive index lens 6. In a known manner, the negative refractive index lens is constituted of a stack of metal/dielectric bilayers. By way of non-limiting example, each bilayer of the stack of bilayers is formed of a layer of silver (Ag) that covers a layer of silica ($SiO_2$). The lens 6 advantageously makes it possible to image, at the surface of the lens, the beam confined at the surface of the layer 1 while conserving its lateral dimension. In the case where the lens is sufficiently thick, for example between 3 nm and 100 nm, it may advantageously constitute a heat sink and thereby make it possible to avoid the heating of the liquid L under the effect of the laser beam Fe.

Figure 13:
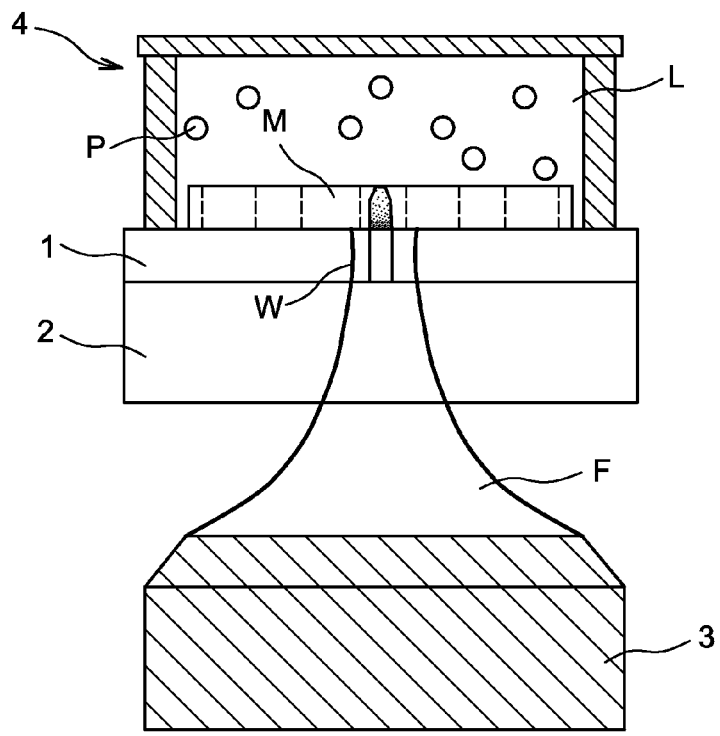
FIG. 13 represents a device for trapping particles which comprises a device for forming an optical trap conforming to the device represented in FIG. 7.

FIG. 13 represents a device for trapping particles which comprises a device for forming an optical trap conforming to the device represented in FIG. 7A. In addition to the components represented in FIG. 7A, the device of FIG. 13 comprises a tank 4 situated above the layer 1. All of the alternatives of the devices for trapping particles represented in FIGS. 9-12 apply, if necessary, to the device for trapping particles represented in FIG. 13.

Figure 14:
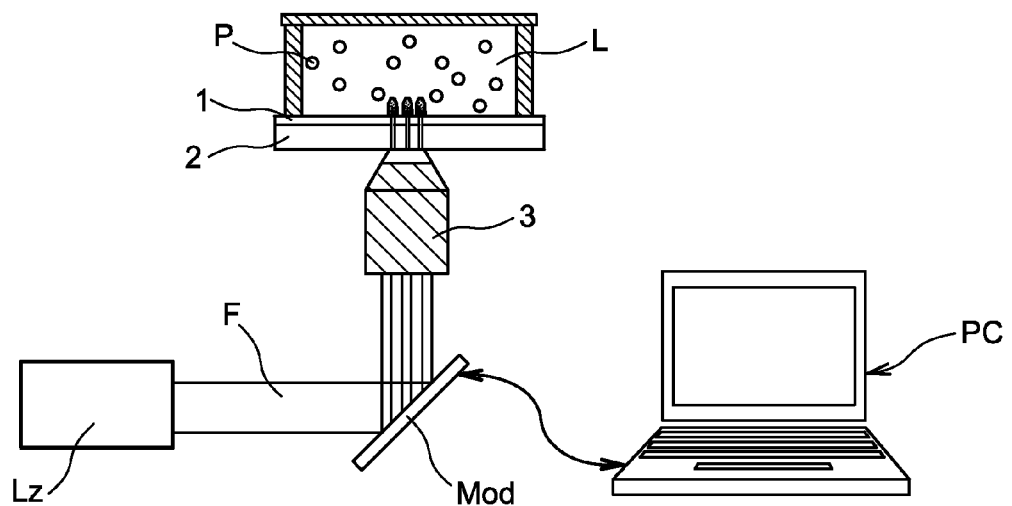
FIG. 14 represents a device for trapping particles which comprises a device for forming an optical trap conforming to the device represented in FIG. 8.

FIG. 14 represents a device for trapping particles which comprises a device for forming an optical trap conforming to the device represented in FIG. 8. In addition to the components represented in FIG. 8, the device of FIG. 14 comprises a tank 4 situated above the layer 1. All of the alternatives of the devices for trapping particles represented in FIGS. 9-12 apply, if necessary, to the device for trapping particles represented in FIG. 14.

In all of the figures that illustrate the device for trapping particles provided with a tank of the invention, the device for forming an optical trap with optical near-field effect constitutes the bottom of the tank. In a more general manner, the invention relates to other embodiments in which the device for forming an optical trap with optical near-field effect constitutes all or part of any wall of the tank, the term "wall" should be taken to mean any component of the tank in contact with the liquid and which delimits the interior from the exterior of the tank (lateral wall, cover, bottom).

An example of method for producing a device for forming an optical trap of the invention conforming to FIG. 6 is given below:

On a silica substrate (for example of Hérasil H1 type), a layer of InSb of 30 nm thickness is deposited by a cathodic sputtering method;

In order to make this layer pass from the amorphous state to the crystalline state, an annealing is carried out for two hours in an oven heated to 200° C.;

Vertical walls are fixed, for example by bonding, onto the layer 1 in order to form the tank;

A liquid solution containing latex beads of 300 nm diameter is prepared, which is injected into the tank via a micropipette;

The tank is covered with a cover glass;

The assembly thereby constituted is placed on a sample holder of the optical system constituted of an inverted microscope jig that includes an objective of numerical aperture of, for example, 1,2 and into which a laser beam from a diode laser emitting, for example, at the wavelength 405 nm, a wave modulated at 1 GHz and 50 mW power is injected.

The sample holder is displaced to trap the latex beads by means of the optical trap. It should be noted that, for reasons of convenience, in the above description, the term "particle" is used to designate, in a general manner, an object or a nano-object capable of being trapped by means of the device for forming an optical trap of the invention. As appears clearly in the table established previously, the term "nano-object" obviously must not be taken to mean an object, the dimensions of which are exclusively of the order of several nanometers.

The invention claimed is:

1. Device for trapping particles contained in a liquid (L) placed in a tank, characterised in that it comprises a substrate that is transparent at a working wavelength, a thin layer of material with non-linear optical properties that are reversible at the working wavelength and which is fixed to a first face of the transparent substrate to form all or part of at least one wall of the tank in contact with the liquid, a device for forming an optical trap with optical near-field effect which comprises a laser source which emits a laser beam at the working wavelength and means for forming a waist of the laser beam, said means being positioned in relation to the transparent substrate so that the laser beam is incident upon that second face of the transparent substrate that lies on the opposite side to the first face and the waist of the laser beam being formed in the thin layer, an evanescent electromagnetic field forming in the extension of the waist of the laser beam, at the surface of the thin layer.

2. Device according to claim 1, wherein an optical mask (M) provided with apertures is deposited on the thin layer.

3. Device according to claim 1, wherein an optical mask (M) provided with apertures is placed between the thin layer and the first face of the substrate.

4. Device according to claim 1 wherein a light modulator (Mod) modulates the phase of the laser beam (F) so that several elementary laser beams are formed under the action of the light modulator, each elementary laser beam participating in the formation of an evanescent field at the surface of the thin layer.

5. Device according to claim 4, wherein each evanescent field at the surface of the thin layer is capable of trapping a particle.

6. Device according to claim 1 wherein an additional layer having an antireflection or mirror function is placed between the thin layer and the substrate.

7. Device according to claim 1 wherein a negative refractive index lens is placed at the surface of the thin layer, in contact with the liquid.

8. Device according to claim 7, wherein the negative index lens includes a stack of metal/dielectric bilayers.

9. Device according to claim 1, wherein the thin layer is covered with a treatment layer (t) capable of controlling the wettability of the surface of the thin layer that is in contact with the liquid.

10. Device for trapping particles according to claim 9, wherein the treatment layer (t) is hydrophobic.

* * * * *